(12) United States Patent
Kim et al.

(10) Patent No.: US 9,862,820 B2
(45) Date of Patent: Jan. 9, 2018

(54) ADDITIVE COMPOSITION FOR POLYMER-MODIFIED ASPHALT, POLYMER-MODIFIED ASPHALT COMPOSITION COMPRISING THE SAME, AND METHOD FOR PREPARING THE SAME

(71) Applicant: Korea Kumho Petrochemical Co., Ltd., Seoul (KR)

(72) Inventors: Jae Yun Kim, Daejeon (KR); Tae Hee Kim, Daejeon (KR); Yeong Min Jung, Incheon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 70 days.

(21) Appl. No.: 14/797,892

(22) Filed: Jul. 13, 2015

(65) Prior Publication Data
US 2016/0017139 A1    Jan. 21, 2016

(30) Foreign Application Priority Data
Jul. 15, 2014    (KR) .................. 10-2014-0089047

(51) Int. Cl.
*C08L 53/02*    (2006.01)
*C08L 95/00*    (2006.01)

(52) U.S. Cl.
CPC .............. *C08L 53/02* (2013.01); *C08L 95/00* (2013.01); *C08L 95/005* (2013.01); *C08L 2205/02* (2013.01); *C08L 2555/22* (2013.01)

(58) Field of Classification Search
None
See application file for complete search history.

(56) References Cited

U.S. PATENT DOCUMENTS

| | | | | |
|---|---|---|---|---|
| 7,009,000 | B2 * | 3/2006 | Bening | ............. C08F 8/04 525/250 |
| 2006/0241218 | A1 * | 10/2006 | Kim | ............. C08L 95/00 524/68 |

FOREIGN PATENT DOCUMENTS

| KR | 10-2005-0021458 A | 3/2005 |
|---|---|---|
| KR | 10-2006-0110892 A | 10/2006 |
| KR | 10-2013-0054069 A | 5/2013 |

* cited by examiner

*Primary Examiner* — Christopher M Rodd
(74) *Attorney, Agent, or Firm* — Saliwanchik, Lloyd & Eisenschenk

(57) ABSTRACT

One aspect of the present invention provides an additive composition for polymer-modified asphalt including a block copolymer having a radial structure and a copolymer of an aromatic vinyl compound of which two ends have different molecular weights and a conjugated diene compound, and a method of preparing the same. When asphalt is prepared using the additive composition for polymer-modified asphalt, properties of the existing polymer-modified asphalt may be maintained while content of sulfur may be reduced, viscosity may decrease, and thereby processability and pavement performance may be improved.

10 Claims, 1 Drawing Sheet

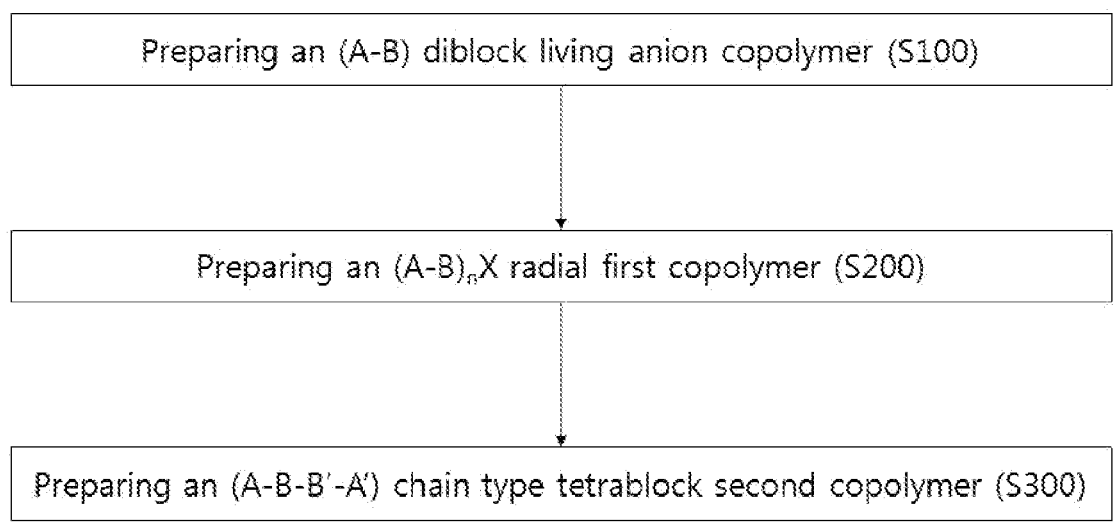

ADDITIVE COMPOSITION FOR POLYMER-MODIFIED ASPHALT, POLYMER-MODIFIED ASPHALT COMPOSITION COMPRISING THE SAME, AND METHOD FOR PREPARING THE SAME

CROSS-REFERENCE TO RELATED APPLICATION

This application claims the benefit under 35 U.S.C. §119 of Korean Application No. 10-2014-0089047, filed Jul. 15, 2014, which is hereby incorporated by reference in its entirety.

BACKGROUND

Technical Field

The present invention relates to an additive composition for polymer-modified asphalt, a polymer-modified asphalt composition including the same, and a method of preparing the same, and more specifically to an additive composition for an asphalt which may maintain physical properties of polymer-modified asphalt, reduce viscosity, and improve processability and pavement performance, a polymer-modified asphalt composition including the same, and a method of preparing the same.

Related Arts

Examples of asphalt modifiers include rubber-based modifiers, thermoplastic resin-based modifiers, thermosetting resin-based modifiers, hydrocarbon-based modifiers, fillers, fibers, antioxidants, reducing agents, etc. Examples of the rubber-based modifiers include a natural rubber, a styrene butadiene rubber (SBR), a crumb rubber, or the like, and examples of the thermoplastic resin-based modifiers include styrene butadiene styrene (SBS), ethylene vinyl acetate (EVA), polyethylene (PE), polypropylene (PP), polyvinyl chloride (PVC), polyethylene terephthalate (PET), etc. Examples of the thermosetting resin-based modifiers include epoxy resins, urethane resins, acrylic resins, phenol resins, petroleum resins, or the like, and examples of the hydrocarbon-based modifiers include natural asphalt, etc.

Among them, a polymer compound, especially, an aromatic vinyl hydrocarbon-conjugated diene block copolymer such as a styrene butadiene styrene (SBS) block copolymer is known to be effective for improving properties at high and low temperature. SBS is a copolymer in which a soft butadiene block and a hard styrene block are bonded. When SBS is dissolved in asphalt at a high temperature, the viscosity and elasticity of asphalt increase, and thus resistance to plastic deformation at a high temperature increases, and the flexibility of asphalt at a low temperature increases, resulting in an increased resistance to cracks at low temperature.

However, when SBS is used as an additive, the viscosity of an asphalt composition increases, a large amount of energy may be consumed for the manufacture and pavement of asphalt. Further, since SBS has low affinity for asphalt, polymer-modified asphalt may be separated into a non-uniform phase.

In order to solve such a problem, a small amount (less than 5 wt %) of sulfur is added to polymer-modified asphalt as a phase separation stabilizer. However, when sulfur is added, the viscosity of the asphalt composition may increase, and hazardous substances such as sulfur oxides may be discharged.

Accordingly, there is a need for the development of an additive composition for polymer-modified asphalt to which less sulfur is added during manufacturing the polymer-modified asphalt, and which has low viscosity and may maintain properties of existing polymer-modified asphalt.

BRIEF SUMMARY

For the ease of manufacture and pavement of a polymer-modified asphalt composition, there are provided an additive composition for polymer-modified asphalt, which has low viscosity and may maintain properties of existing polymer-modified asphalt, a polymer-modified asphalt composition including the same, and a method of preparing the same.

One aspect of the present invention provides an additive composition for polymer-modified asphalt, comprising: a first copolymer compound having a radial structure and represented by the following Formula 1; and a second copolymer compound represented by the following Formula 2.

$$(A-B)_n X \qquad \text{[Formula 1]}$$

$$A-B-B'-A' \qquad \text{[Formula 2]}$$

In Formulas 1 and 2, each of A and A' is an aromatic vinyl compound having a different molecular weight, each of B and B' is a conjugated diene compound, n is one of the integers from 3 to 6, and X is a residue of a coupling agent.

In one embodiment, a content of the first copolymer compound may be 5 to 50 wt % based on a total weight of the additive composition for polymer-modified asphalt.

In one embodiment, a molecular weight of the first copolymer compound may be higher than a molecular weight of the second copolymer compound, and may be equal to or less than two times of the molecular weight of the second copolymer compound.

In one embodiment, a molecular weight of the A' may be higher than a molecular weight of the A, and may be equal to or less than two times of the molecular weight of the A.

In one embodiment, the aromatic vinyl compound may be one selected from the group consisting of styrene, α-methylstyrene, o-methylstyrene, p-methylstyrene, p-tert-butylstyrene, and a polymerized unit of at least one thereof.

In one embodiment, a vinyl content of the B and the B' each may be from 10 to 50 mol %. In one embodiment, the conjugated diene compound may be one selected from the group consisting of 1,3-butadiene, isoprene, and a polymerized unit of at least one thereof.

In one embodiment, the coupling agent may be a diester compound, a triester compound or a mixture thereof.

In one embodiment, the coupling agent may be one selected from the group consisting of dialkyl carbonate, dialkyl malonate, dialkyl phthalate, dialkyl succinate, dialkyl glutarate, dialkyl adipate, dialkyl pimelate, dialkyl suberate, dialkyl sebacate, dialkyl azelate, dialkyl brassylate, dialkyl tetradecandioate, dicarboxylate, tricarboxylate and a mixture of two or more thereof.

Another aspect of the present invention provides a polymer-modified asphalt composition, comprising: asphalt, and the above-described additive composition for polymer-modified asphalt.

In one embodiment, a weight ratio of the asphalt to the additive composition for polymer-modified asphalt may be 100:1 to 10.

Still another aspect of the present invention provides a method of preparing an additive composition for polymer-modified asphalt, comprising: preparing a living anionic polymer by polymerizing an aromatic vinyl compound with a conjugated diene compound; preparing a first copolymer compound having a radial structure and represented by the following Formula 1 by reacting a portion of the living anionic polymer with a coupling agent; and preparing a second copolymer compound represented by the following Formula 2 by sequentially polymerizing a remainder of the living anionic polymer with a conjugated diene compound and an aromatic vinyl compound.

$$(A\text{-}B)_n X \quad \text{[Formula 1]}$$

$$A\text{-}B\text{-}B'\text{-}A' \quad \text{[Formula 2]}$$

In Formulas 1 and 2, each of A and A' is an aromatic vinyl compound having a different molecular weight, each of B and B' is a conjugated diene compound, n is one of the integers from 3 to 6, and X is a residue of a coupling agent.

In one embodiment, a content of the first copolymer compound may be 5 to 50 wt % based on a total weight of the additive composition for polymer-modified asphalt.

In one embodiment, a molecular weight of the first copolymer compound may be higher than a molecular weight of the second copolymer compound, and may be equal to or less than two times of the molecular weight of the second copolymer compound.

In one embodiment, a molecular weight of the A' may be higher than a molecular weight of the A, and may be equal to or less than two times of the molecular weight of the A.

In one embodiment, the aromatic vinyl compound may be one selected from the group consisting of styrene, α-methylstyrene, o-methylstyrene, p-methylstyrene, p-tert-butylstyrene, and a polymerized unit of at least one thereof.

In one embodiment, a vinyl content of the B and the B' each may be 10 to 50 mol %.

In one embodiment, the conjugated diene compound may be one selected from the group consisting of 1,3-butadiene, isoprene, and a polymerized unit of at least one thereof.

In one embodiment, the coupling agent may be a diester compound, a triester compound or a mixture thereof.

In the embodiment, the coupling agent may be one selected from the group consisting of dialkyl carbonate, dialkyl malonate, dialkyl phthalate, dialkyl succinate, dialkyl glutarate, dialkyl adipate, dialkyl pimelate, dialkyl suberate, dialkyl sebacate, dialkyl azelate, dialkyl brassylate, dialkyl tetradecandioate, dicarboxylate, tricarboxylate and a mixture of two or more thereof.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 illustrates a method of preparing an additive composition for polymer-modified asphalt according to one embodiment of the present invention.

DETAILED DESCRIPTION

Exemplary embodiments of the present invention will be described in detail below with reference to the accompanying drawings. However, the present invention may be realized in various different forms, and therefore is not limited to examples to be described herein. In addition, to clearly explain the present invention, parts not relating to the descriptions will be omitted, and like reference marks denote the like parts throughout the specification.

In the specification, when one part "includes" or "comprises" a component, unless particularly described otherwise, it means that the part can further include a different component, not excluding the component.

Hereinafter, examples of the present invention will be described in detail with reference to the accompanying drawings.

Additive Composition for Polymer-modified Asphalt

One aspect of the present invention provides an additive composition for polymer-modified asphalt, comprising: a first copolymer compound having a radial structure and represented by the following Formula 1; and a second copolymer compound represented by the following Formula 2.

$$(A\text{-}B)_n X \quad \text{[Formula 1]}$$

$$A\text{-}B\text{-}B'\text{-}A' \quad \text{[Formula 2]}$$

In Formulas 1 and 2, each of A and A' is an aromatic vinyl compound having a different molecular weight, each of B and B' is a conjugated diene compound, n is one of the integers from 3 to 6, and X is a residue of a coupling agent.

In the first copolymer compound, 3, 4, 5 or 6 (A-B) diblock copolymers, specifically, (A-B) living anion polymers each may be bonded or coupled according to the number of functional groups included in the coupling agent.

The residue (X) of the coupling agent is derived from the coupling agent, and may be generated by the coupling reaction of a polymer and coupling agent.

A content of the first copolymer compound may be 5 to 50 wt % based on a total weight of the additive composition for polymer-modified asphalt. When the content of the first copolymer compound having a radial structure is less than 5 wt %, the effect of decreasing the viscosity of the polymer-modified asphalt composition is low, resulting in the consumption of a large amount of energy during pavement. When the content of the first copolymer compound is more than 50 wt %, properties of asphalt such as a softening point, ductility or the like may be reduced.

The content of the first copolymer compound in the additive composition for polymer-modified asphalt may depend on an added amount of the coupling agent. The added amount of the coupling agent may be determined by sampling a small amount of the additive composition for polymer-modified asphalt obtained during preparation after addition of the coupling agent and before addition of the conjugated diene compound, and using gel permeation chromatography (GPC) calibrated by standard polystyrene.

As used herein, the term "GPC" may refers to a method or device in which the time that a target object passes through a column is measured, and then the molecular weight of polystyrene eluting from the column at the same time is measured as the molecular weight of the target object.

A molecular weight of the first copolymer compound may be higher than a molecular weight of the second copolymer compound, and may be equal to or less than two times of the molecular weight of the second copolymer compound. When the molecular weight of the first copolymer compound having a radial structure is equal to or less than that of the second copolymer compound, mechanical properties such as ductility of asphalt may be reduced. When the molecular weight of the first copolymer compound is more than two times of that of the second copolymer compound, an effect of reducing viscosity may be insignificant.

A molecular weight of A' (as an aromatic vinyl compound, a monomer or a polymerized unit of monomers) may be higher than that of the A (as an aromatic vinyl compound, a monomer or a polymerized unit of monomers), and may be equal to or less than two times of that of the A. When the molecular weight of monomers or units positioned at two ends are the same like a styrenic block copolymer which has been conventionally used as a polymer-modified asphalt additive, a viscosity of asphalt may be reduced, but a softening point is lowered, and thus asphalt may be randomly deformed at a high temperature.

As used herein, the term "molecular weight" may be interpreted differently according to a type of the A or A'. More specifically, the "molecular weight" may refer to a molecular weight of a monomer when the A or A' is a vinyl compound monomer, and may refer to a weight average molecular weight (Mw) of the unit when the A or A' is a polymerized unit of the monomers.

The aromatic vinyl compound may be one selected from the group consisting of styrene, a-methylstyrene, o-methylstyrene, p-methylstyrene, p-tert-butylstyrene, and a polymerized unit of at least one thereof. Preferably, styrene which has less steric hindrance may be used as the aromatic vinyl compound.

A vinyl content of the B (as a conjugated diene compound, a monomer or a polymerized unit of monomers) and the B' (as a conjugated diene compound, a monomer or a polymerized unit of monomers) may be from 10 to 50 mol %, and preferably, may be from 20 to 50 mol %, respectively. When the vinyl content is less than 10 mol %, excessive phase separation of the additive composition may occur in the polymer-modified asphalt composition, and an effect of reducing viscosity may be insignificant. In addition, when the vinyl content is more than 50 mol %, a large amount of an expensive Lewis base is required during polymerization, and thus manufacture cost may increase, and mechanical properties of asphalt such as ductility may be reduced.

The conjugated diene compound may be one selected from the group consisting of 1,3-butadiene, isoprene, and a polymerized unit of at least one thereof, and preferably, may be 1,3-butadiene having less steric hindrance.

The coupling agent may be a diester compound, a triester compound or a mixture thereof. Non-limiting examples of the coupling agent which may be used include one selected from the group consisting of dialkyl carbonate, dialkyl malonate, dialkyl phthalate, dialkyl succinate, dialkyl glutarate, dialkyl adipate, dialkyl pimelate, dialkyl suberate, dialkyl sebacate, dialkyl azelate, dialkyl brassylate, dialkyl tetradecandioate, dicarboxylate, tricarboxylate and a mixture of two or more thereof, preferably, dialkyl sebacate which is a diester, and more preferably, dibutyl sebacate.

Polymer-modified Asphalt Composition

Another aspect of the present invention provides a polymer-modified asphalt composition including asphalt; and the additive composition for polymer-modified asphalt.

A type of the asphalt is not particularly limited, and may include all types of usual asphalts such as natural asphalt and asphalt made from petroleum. Particularly, petroleum asphalts such as straight asphalt, asphalt cement or blown asphalt may be mainly used.

A weight ratio of the asphalt to the additive composition for polymer-modified asphalt may be 100 (parts by weight) to 1 to 10 (parts by weight). When the weight ratio of the additive composition for polymer-modified asphalt is less than 1, concentration of polymers in the polymer-modified asphalt composition is low, and thus a performance of polymers as a modifier is difficult to be implemented. Moreover, when the weight ratio of the additive composition for polymer-modified asphalt is more than 10, viscosity at a high temperature may increase, and thus dispersibility and flowability of the polymer-modified asphalt composition may be reduced. Further, dispersion may be delayed, and thus thermal degradation of an asphalt binder and mechanical degradation due to shear stress may occur.

Further, sulfur may be mixed during preparation of the polymer-modified asphalt composition so as to suppress phase separation. At this time, an added amount of sulfur may be 0.1 to 20 parts by weight, preferably 0.1 to 10 parts by weight based on 100 parts by weight of the additive composition for polymer-modified asphalt. When the added amount of sulfur is more than 20 parts by weight, phase separation may occur according to gelation, and the generation rate of hazardous substances containing sulfur may increase.

In addition, the polymer-modified asphalt composition may further include a vegetable wax as an additional modifier. As compared to a polyethylene wax which has been conventionally added as a modifier, the vegetable wax may reduce viscosity of the polymer-modified asphalt composition at high temperature, and may further reduce properties at low temperature. A type of the vegetable wax which may be used is not particularly limited, and any type of wax of which the raw material is derived from natural products, such as a hydrogenated vegetable wax, a modified vegetable wax or the like may be used. Particularly, in consideration of commercial obtainability, a palm wax extracted from a coconut palm may be used. Here, the melting temperature of the palm wax is about 60° C.

Furthermore, a modified wax of which some properties are improved may be used. Particularly, a palm wax modified with sodium hydroxide may be used. Here, the melting temperature of the palm wax is about 80 to 110° C.

Method of Preparing Polymer-modified Asphalt Composition

Referring to FIG. 1, still another aspect of the present invention provides a method of preparing an additive composition for polymer-modified asphalt, comprising: preparing a living anionic polymer by polymerizing an aromatic vinyl compound with a conjugated diene compound (S100); preparing a first copolymer compound having a radial structure and represented by the following Formula 1 by reacting a portion of the living anionic polymer with a coupling agent (S200); and preparing a second copolymer compound represented by the following Formula 2 by sequentially polymerizing the remainder of the living anionic polymer with a conjugated diene compound and an aromatic vinyl compound (S300).

$$(A-B)_nX \quad \text{[Formula 1]}$$

$$A-B-B'-A' \quad \text{[Formula 2]}$$

In Formulas 1 and 2, each of A and A' is an aromatic vinyl compound having a different molecular weight, each of B and B' is a conjugated diene compound, n is one of the integers from 3 to 6, and X is a residue of a coupling agent.

Each step described in the preparation method may be performed in a single reactor, or two or more reactors may be used per step as necessary.

In the preparing of the living anionic polymer (S100), an (A-B) diblock copolymer may be prepared by polymerizing A as an aromatic vinyl compound with B as a conjugated diene compound.

As described above, each of the A and B may be an aromatic vinyl compound monomer or a conjugated diene compound monomer, and may be a unit of the aromatic vinyl compound monomers polymerized to a certain degree or a unit of the conjugated diene compound monomers polymerized to a certain degree. For ease of analyzing a molecular weight or structure of the first and second copolymer compound, preferably, each of the A and B may be a unit of the monomers polymerized to a certain degree.

More specifically, after an organic solvent, an aromatic vinyl compound monomer and an organo-lithium initiator are added to a single reactor to polymerize the unit (A) of the aromatic vinyl compound, a conjugated diene compound monomer and a Lewis base are further added thereto to further polymerize the unit (B) of the conjugated diene compound, and thereby a (A-B) biblock copolymer may be prepared.

When the unit (B) of the conjugated diene compound is polymerized, a starting temperature may be 10 to 50° C. When the starting temperature is less than 10° C., a reaction speed is slow, and when the starting temperature is more than 50° C., it is difficult to adjust a vinyl content by a Lewis base and a polymerization temperature.

The organic solvent may be one selected from the group consisting of an aliphatic hydrocarbon-based solvent, a cyclic aliphatic hydrocarbon-based solvent, an aromatic hydrocarbon-based solvent and a mixture of two or more thereof, preferably, may be one selected from the group consisting of n-pentane, n-hexane, n-heptane, isooctane, cyclohexane, toluene, benzene, xylene and a mixture of two or more thereof, and more preferably, may be cyclohexane, but is not limited thereto.

The organolithium initiator may be an alkyl lithium compound, and preferably may be an alkyl lithium compound having a $C_3$ to $C_{10}$ alkyl group. Non-limiting examples of the organolithium initiator which may be used include one selected from the group consisting of methyl lithium, ethyl lithium, isopropyl lithium, n-butyl lithium, sec-butyl lithium, tert-butyl lithium and a mixture of two or more thereof, and preferably, may be n-butyl lithium or sec-butyl lithium, but is not limited thereto.

The Lewis base may be one selected from the group consisting of tetrahydrofuran, diethyl ether, diethylene glycol dimethyl ether, ditetrahydrofuryl propane, triethylamine, N,N,N,N-tetramethylethylenediamine and a mixture of two or more thereof, and preferably, may be tetrahydrofuran, but is not limited thereto. An added amount of the Lewis base may be adjusted according to the total number of moles of anions and a vinyl content of a target conjugated diene compound under the condition of the starting temperature. The vinyl content of the conjugated diene compound B (or B') is the same as described above.

The prepared (A-B) diblock copolymer is a living anionic polymer, and may additionally generate a polymerase chain reaction with other monomers or units.

In the preparing of the first copolymer compound (S200), a radial copolymer compound may be prepared by reacting a portion of the living anionic polymer (A-B) with a coupling agent having n functional groups. The type, added amount of the coupling agent which may be used and the consequential content of the first copolymer compound are the same as described above.

In the preparing of the second copolymer compound (S300), a chain type copolymer compound may be prepared by sequentially polymerizing a remainder of the living anionic polymer (A-B) with a conjugated diene compound (B') and an aromatic vinyl compound (A').

An (A-B) diblock copolymer remaining in a reactor after the radial copolymer compound is prepared through a coupling reaction may also be a living anionic polymer capable of additionally generating a polymerase chain reaction with other monomers or units. In a single reactor, an (A-B-B') triblock copolymer is prepared by adding a conjugated diene compound monomer to a remaining living anionic polymer to further polymerize with the unit (B') of the conjugated diene compound in the presence of the organic solvent, and the aromatic vinyl compound monomer is subsequently added thereto to further polymerize with the unit (A') of an aromatic vinyl compound, and thereby the second copolymer compound, more specifically, an (A-B-B'-A') tetrablock copolymer may be prepared.

Further, all polymerization reactions in each of the step may be performed under a nitrogen or argon gas which is an inert gas, and a polymerization temperature may be 0 to 100° C. After the polymerization is complete, the copolymer compound may be stored under the constant pressure of the inert gas so as to avoid contacting with moisture and oxygen in air.

When the first and second copolymer compounds are prepared, a deactivation of the living anionic polymer remaining in the reactor may be implemented by adding a polymerization terminator such as water, alcohol, or organic/inorganic acids, preferably, methanol.

Hereinafter, Examples of the Present Invention will be Described in Detail.

Styrene and butadiene are selected as monomers, and are polymerized to prepare the additive composition for modified asphalt including the radial copolymer compound of the Formula 1 and the chain type copolymer compound of the Formula 2. Dibutyl sebacate, cyclohexane, n-butyl lithium and tetrahydrofuran are used as a coupling agent, an organic solvent, an organo-lithium initiator and a Lewis base, respectively.

EXAMPLE 1

An inside of a 2 L pressure-resistant reactor is sufficiently substituted with an argon (Ar) gas. 900 g of refined cyclohexane, 0.9 g of tetrahydrofuran (THF), and 29 g of a styrene monomer are injected thereto, and a temperature is held at 50° C. 0.8 mL of n-butyllithium (BuLi) (2M-cyclohexane solution) as an initiator is introduced into the reactor to initiate polymerization. 56 g of a butadiene monomer is introduced and polymerized 10 minutes after a polymerization temperature of the styrene monomer reached a maximum temperature, and a coupling reaction is induced by introducing 20 mg of dibutyl sebacate into the reactor 5 minutes after a polymerization temperature of butadiene reached a maximum temperature.

84 g of a butadiene monomer is further introduced into the reactor and polymerized 5 minutes after the coupling agent was introduced, and 31 g of a styrene monomer is further introduced and polymerized 5 minutes after a polymerization temperature of the butadiene monomer reached the maximum temperature. Methanol as a polymerization terminator is introduced to completely remove a vitality of a living anionic polymer remaining in a polymerization solution. Thereafter, an antioxidant is added into the polymerization solution after the reaction is complete, cyclohexane is removed using a roll mill, and thereby an additive composition for polymer-modified asphalt is prepared.

EXAMPLE 2

An additive composition for polymer-modified asphalt is prepared in the same manner as in Example 1 except that 30 mg of dibutyl sebacate as a coupling agent is introduced.

EXAMPLE 3

An additive composition for polymer-modified asphalt is prepared in the same manner as in Example 1 except that 35 mg of dibutyl sebacate as a coupling agent is introduced.

EXAMPLE 4

An additive composition for polymer-modified asphalt is prepared in the same manner as in Example 1 except that 40 mg of dibutyl sebacate as a coupling agent is introduced.

EXAMPLE 5

An additive composition for polymer-modified asphalt is prepared in the same manner as in Example 1 except that 60 mg of dibutyl sebacate as a coupling agent is introduced.

COMPARATIVE EXAMPLE 1

An inside of a 2 L pressure-resistant reactor is sufficiently substituted with an argon gas. 900 g of refined cyclohexane, 0.9 g of THF and 60 g of a styrene monomer are injected thereto, and a temperature is held at 50° C. 1.6 mL of n-BuLi (2M-cyclohexane solution) as an initiator is introduced into the reactor to initiate polymerization. 140 g of a butadiene monomer is introduced and polymerized 10 minutes after a polymerization temperature of the styrene monomer reached a maximum temperature, and a coupling reaction is induced by introducing 0.33 g of dimethyl dichlorosilane into the reactor 5 minutes after a polymerization temperature of butadiene reached a maximum temperature.

Methanol as a polymerization terminator is introduced to completely deactivate a living anionic polymer remaining in a polymerization solution. Thereafter, an antioxidant is added into the polymerization solution after the reaction is complete, cyclohexane is removed using a roll mill, and thereby an additive composition for polymer-modified asphalt is prepared.

COMPARATIVE EXAMPLE 2

An inside of a 2 L pressure reactor is sufficiently substituted with an argon gas. 900 g of refined cyclohexane, 0.9 g of THF and 32 g of a styrene monomer are injected thereto, and a temperature is held at 50° C. 0.8 mL of n-BuLi (2M-cyclohexane solution) as an initiator is introduced into the reactor to initiate polymerization. 53 g of a butadiene monomer is introduced and polymerized 10 minutes after a polymerization temperature of the styrene monomer reached a maximum temperature, and a coupling reaction is induced by introducing 30 mg of dibutyl sebacate into the reactor 5 minutes after a polymerization temperature of butadiene reached a maximum temperature.

87 g of a butadiene monomer is further introduced into the reactor and polymerized 5 minutes after the coupling agent is introduced, and 28 g of a styrene monomer is further introduced and polymerized 5 minutes after a polymerization temperature of the butadiene monomer reached a maximum temperature. Methanol as a polymerization terminator is introduced to completely deactivate a living anionic polymer remaining in a polymerization solution. Thereafter, an antioxidant is added into the polymerization solution after the reaction is complete, cyclohexane is removed using a roll mill, and thereby an additive composition for polymer-modified asphalt is prepared.

COMPARATIVE EXAMPLE 3

An additive composition for polymer-modified asphalt is prepared in the same manner as in Example 1 except that 10 mg of tetrachlorosilane as a coupling agent is introduced.

COMPARATIVE EXAMPLE 4

An additive composition for polymer-modified asphalt is prepared in the same manner as in Example 1 except that 7 mg of dibutyl sebacate as a coupling agent is introduced.

COMPARATIVE EXAMPLE 5

An additive composition for polymer-modified asphalt is prepared in the same manner as in Example 1 except that 140 mg of dibutyl sebacate as a coupling agent is introduced.

Consequentially, Comparative Example 1 shows a styrene-butadiene copolymer which has been conventionally used as an additive for polymer-modified asphalt, where dichlorodimethylsilane is used as a coupling agent, and thereby 85% (coupling rate) of a triblock copolymer is generated and 15% of a styrene-butadiene diblock copolymer remaining after reaction is complete. In Comparative Example 2, an added amounts of styrene and butadiene are adjusted to polymerize such that the molecular weights of a styrene block A and a styrene block A' are the same. In Comparative Example 3, tetrachlorosilane is used as a coupling agent. In Comparative Examples 4 and 5, a polymerization process is performed in the same manner as in Examples 1 to 5, but an added amount of the coupling agent is adjusted to control the content of the first copolymer compound.

A result of qualitative analysis for the additive compositions for polymer-modified asphalt prepared in Examples 1 to 5 and Comparative Examples 1 to 5 was listed in the following Table 1.

TABLE 1

| Division | Coupling rate of first copolymer (wt %) | Molecular weight of A (g/mol) | Molecular weight of second copolymer (g/mol) | Molecular weight of A' (g/mol) | Vinyl content of B and B' (mol %) | Total molecular weight (g/mol) | Total content of styrene (wt %) |
|---|---|---|---|---|---|---|---|
| Example 1 | 10.2 | 14,500 | 109,000 | 18,000 | 34.2 | 118,000 | 30.0 |
| Example 2 | 14.7 | 15,000 | 117,000 | 21,000 | 33.3 | 127,000 | 30.8 |
| Example 3 | 16.1 | 13,000 | 99,000 | 17,000 | 34.2 | 108,000 | 29.8 |
| Example 4 | 19.8 | 14,500 | 113,000 | 20,000 | 32.8 | 123,000 | 30.1 |
| Example 5 | 31.1 | 13,800 | 104,000 | 18,000 | 32.6 | 113,000 | 30.3 |
| Comparative Example 1 | 0 | 16,500 | 115,000 | 16,500 | 12.1 | 115,000 | 30.0 |

TABLE 1-continued

| Division | Coupling rate of first copolymer (wt %) | Molecular weight of A (g/mol) | Molecular weight of second copolymer (g/mol) | Molecular weight of A' (g/mol) | Vinyl content of B and B' (mol %) | Total molecular weight (g/mol) | Total content of styrene (wt %) |
|---|---|---|---|---|---|---|---|
| Comparative Example 2 | 15.3 | 16,100 | 110,000 | 16,100 | 33.3 | 120,000 | 30.3 |
| Comparative Example 3 | 15.5 | 13,200 | 105,000 | 18,000 | 32.9 | 110,000 | 30.6 |
| Comparative Example 4 | 3.4 | 15,800 | 109,000 | 17,500 | 33.1 | 112,000 | 29.9 |
| Comparative Example 5 | 68.7 | 15,100 | 110,000 | 17,100 | 33.1 | 123,000 | 30.7 |

In Table 1, the coupling rate of the first copolymer compound represents a percentage of weight of the first copolymer compound based on a total weight of the additive composition for polymer-modified asphalt. The coupling rate and molecular weight of the first copolymer ((A-B)X) may be measured using a small amount of a sample of the first copolymer by gel permeation chromatography after the coupling agent was added and before butadiene (B') was additionally added as in Example 1. The coupling rate may be calculated using the ratio between the first copolymer and the styrene-butadiene block copolymer (A-B) which is not coupled. The molecular weight (weight average molecular weight, Mw) of a styrene unit (or block) A may be calculated from the number of moles of an added alkyl lithium which is a reaction initiator and an added amount of the styrene monomer, or may be measured by polymerizing the styrene monomers, sampling a small amount thereof, and using gel permeation chromatography.

The molecular weight (weight average molecular weight, Mw) of the second copolymer (A-B-B'-A') and the molecular weight of the styrene unit (or block) A' may be calculated from the number of moles of a residual anion which may be known from the content of the styrene-butadiene block copolymer (A-B) which is not coupled through the result of gel permeation chromatography, and the amount of additionally added butadiene (B') and styrene (A'). Further, the vinyl content of the butadiene block copolymer (B or B') and the total content of styrene in the additive composition for polymer-modified asphalt may be obtained using a sample by nuclear magnetic resonance (NMR) analysis after polymerization is complete.

EXPERIMENTAL EXAMPLE 1

Comparative Experiment for Properties of Polymer-modified Asphalt Composition

The additive compositions for polymer-modified asphalt according to Examples 1 to 5 and Comparative Examples 1 to 3 were added at 4.5 parts by weight based on 100 parts by weight of asphalt, and thereby polymer-modified asphalt compositions of Preparation Examples 1 to 5 and Comparative Preparation Examples 1 to 5 were prepared at 160° C. The result of measuring a softening point, ductility and high temperature (160° C.) viscosity of the prepared polymer-modified asphalt compositions is listed in the following Table 2. The softening point was measured using ASTM D36, and ductility was measured using ASTM D113 at a temperature of 5° C.±0.5° C. and a separation rate of 5 cm/min±0.5%. Furthermore, viscosity was measured at 160° C. using a rotational viscometer.

TABLE 2

| Division | Softening point (° C.) | Ductility (cm) Before thin film oven | Ductility (cm) After thin film oven | Viscosity (160° C., cps) |
|---|---|---|---|---|
| Preparation Example 1 | 72.7 | 42.1 | 13.2 | 435 |
| Preparation Example 2 | 73.2 | 43.2 | 13.8 | 421 |
| Preparation Example 3 | 72.9 | 42.5 | 13.4 | 418 |
| Preparation Example 4 | 71.5 | 41.5 | 12.9 | 406 |
| Preparation Example 5 | 69.7 | 40.2 | 12.1 | 394 |
| Comparative Preparation Example 1 | 72.8 | 41.5 | 12.9 | 475 |
| Comparative Preparation Example 2 | 65.1 | 35.3 | 12.5 | 462 |
| Comparative Preparation Example 3 | 73.9 | 39.2 | 12.6 | 460 |
| Comparative Preparation Example 4 | 73.1 | 42.6 | 13.4 | 480 |
| Comparative Preparation Example 5 | 59.1 | 28.9 | 8.5 | 332 |

Referring to Table 2, the polymer-modified asphalt compositions according to Preparation Examples 1 to 5 which include a portion of the radial first copolymer compound and prepared by the coupling reaction have viscosity lower than that of the polymer-modified asphalt composition according to Comparative Preparation Example 1 which includes none of the first copolymer compound. Further, as compared to the polymer-modified asphalt composition according to Comparative Preparation Example 2 in which a molecular weights of A and A' units positioned at both ends of the second copolymer compound are the same, the polymer-modified asphalt composition in which the molecular weights of A and A' units are different has lower viscosity, a higher softening point and improved ductility. In Comparative Preparation Example 3 in which tetrachlorosilane was used as a coupling agent, the first copolymer compound was included, but it was determined that an effect of reducing viscosity was less remarkable than that in Preparation Examples 1 to 5 in which dibutyl sebacate was used as a coupling agent.

Further, when the polymer-modified asphalt compositions according to Preparation Examples 1 to 5 are compared with those according to Comparative Preparation Examples 4 and 5, it may be determined that when the coupling rate of the first copolymer compound is less than 5 wt % (3.4 wt %), the effect of reducing viscosity is low, and when the coupling rate of the first copolymer compound is more than 50 wt % (68.7 wt %), properties such as a softening point, ductility or the like are rapidly decreased.

EXPERIMENTAL EXAMPLE 2

Comparative Experiment for Properties of Polymer-modified Asphalt Composition Containing Sulfur 4.5 parts by weight of the additive composition for polymer-modified asphalt according to Example 1 and 0.1 parts by weight of sulfur were added based on 100 parts by weight of the asphalt, and a polymer-modified asphalt composition according to Preparation Example 6 was prepared at 160° C. A polymer-modified asphalt composition in Comparative Preparation Example 6 is a polymer-modified asphalt composition prepared by adding 4.5 parts by weight of the additive composition for polymer-modified asphalt according to Comparative Example 1 and 0.18 parts by weight of sulfur based on 100 parts by weight of the asphalt, and the polymer-modified asphalt composition in Comparative Preparation Example 7 is a polymer-modified asphalt composition prepared in the same manner as in Comparative Preparation Example 6 except that 0.1 parts by weight of sulfur was added. The result of measuring a softening point, ductility and high temperature (160° C.) viscosity of the prepared polymer-modified asphalt compositions was listed in the following Table 3. The softening point was measured using ASTM D36, and ductility was measured using ASTM D113 at a temperature of 5° C.±0.5° C. and a separation rate of 5 cm/min±0.5%. Furthermore, viscosity was measured at 160° C. using a rotational viscometer.

TABLE 3

| Division | Add amount of sulfur (parts by weight) | Softening point ( )° C. | Ductility (cm) Before thin film oven | Ductility (cm) After thin film oven | Viscosity (160° C., cps) |
|---|---|---|---|---|---|
| Preparation Example 6 | 0.1 | 83.7 | 34.5 | 17.8 | 570 |
| Comparative Preparation Example 6 | 0.18 | 83.9 | 30.2 | 15.0 | 730 |
| Comparative Preparation Example 7 | 0.1 | 76.1 | 28.3 | 14.1 | 630 |

Referring to Tables 2 and 3, it may be determined that all the polymer-modified asphalt compositions according to Preparation Example 6 and Comparative Preparation Examples 6 and 7 show an increased softening point, an increased ductility after a thin film oven while viscosity was increased. However, although viscosity was increased, viscosity of the polymer-modified asphalt composition according to Preparation Example 6 was determined to be the lowest, and thus it was determined that the polymer-modified asphalt composition according to Preparation Example 6 has properties more excellent than those of the polymer-modified asphalt compositions according to Comparative Preparation Examples 6 and 7 even when a small amount of sulfur was added to the polymer-modified asphalt composition according to Preparation Example 6.

According to the embodiment of the present invention, when a polymer-modified asphalt composition is prepared using the additive composition for polymer-modified asphalt including a block copolymer having a radial structure and a copolymer of an aromatic vinyl compound of which two ends have different molecular weights and a conjugated diene compound, physical properties of the existing polymer-modified asphalt may be maintained while the content of sulfur may be reduced, viscosity may decrease, and thereby processability and pavement performance may be improved.

The effect of the present invention is not limited to the above-described effect, and should be understood to include all effects which may be deduced from the configuration of the invention described in the detailed description or claims of the present invention.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. An additive composition for polymer-modified asphalt, comprising:
   a first copolymer compound having a radial structure and represented by the following Formula 1; and
   a second copolymer compound represented by the following Formula 2:

$(A-B)_n X$                 [Formula 1]

$A-B-B'-A'$                 [Formula 2]

wherein each of A and A' is an aromatic vinyl compound, a molecular weight of A' is higher than a molecular weight of A, each of B and B' is a conjugated diene compound, n is one of the integers from 3 to 6, X is a residue of a coupling agent, a molecular weight of the first copolymer compound is higher than a molecular weight of the second copolymer compound, and the molecular weight of the first copolymer compound is equal to or less than two times the molecular weight of the second copolymer compound.

2. The composition of claim 1, wherein a content of the first copolymer compound is 5 to 50 wt % based on a total weight of the additive composition for polymer-modified asphalt.

3. The composition of claim 1, wherein a molecular weight of the A' is equal to or less than two times of the molecular weight of the A.

4. The composition of claim 1, wherein the aromatic vinyl compound is one selected from the group consisting of styrene, α-methylstyrene, o-methylstyrene, p-methylstyrene, p-tert-butylstyrene, and a polymerized unit of at least one thereof.

5. The composition of claim 1, wherein vinyl content of the B and the B' each are 10 to 50 mol %.

6. The composition of claim 1, wherein the conjugated diene compound is one selected from the group consisting of 1,3-butadiene, isoprene, and a polymerized unit of at least one thereof.

7. The composition of claim 1, wherein the coupling agent is a diester compound, a triester compound or a mixture thereof.

8. The composition of claim 1, wherein the coupling agent is one selected from the group consisting of dialkyl carbonate, dialkyl malonate, dialkyl phthalate, dialkyl succinate, dialkyl glutarate, dialkyl adipate, dialkyl pimelate, dialkyl suberate, dialkyl sebacate, dialkyl azelate, dialkyl brassylate, dialkyl tetradecandioate, dicarboxylate, tricarboxylate and a mixture of two or more thereof.

9. A polymer-modified asphalt composition, comprising:
   asphalt; and
   the additive composition for polymer-modified asphalt according to claim 1.

10. The composition of claim 9, wherein a weight ratio of the asphalt to the additive composition for polymer-modified asphalt is 100:1 to 10.

\* \* \* \* \*